US012434285B2

(12) United States Patent
Eckelsbach et al.

(10) Patent No.: US 12,434,285 B2
(45) Date of Patent: Oct. 7, 2025

(54) ROLLER ASSEMBLY

(71) Applicant: SMS group GmbH, Düsseldorf (DE)

(72) Inventors: Holger Eckelsbach, Monheim (DE); Stefan Peggen, Wassenberg (DE)

(73) Assignee: SMS group GmbH, Düsseldorf (DE)

( * ) Notice: Subject to any disclaimer, the term of this patent is extended or adjusted under 35 U.S.C. 154(b) by 360 days.

(21) Appl. No.: 18/027,564

(22) PCT Filed: Sep. 13, 2021

(86) PCT No.: PCT/EP2021/075030
§ 371 (c)(1),
(2) Date: Jun. 16, 2023

(87) PCT Pub. No.: WO2022/063615
PCT Pub. Date: Mar. 31, 2022

(65) Prior Publication Data
US 2023/0311181 A1 Oct. 5, 2023

(30) Foreign Application Priority Data
Sep. 28, 2020 (DE) .......................... 102020212179.6

(51) Int. Cl.
*B21B 13/00* (2006.01)
*B21B 31/07* (2006.01)
*F16J 15/3232* (2016.01)
(52) U.S. Cl.
CPC .......... *B21B 13/005* (2013.01); *B21B 31/078* (2013.01); *F16J 15/3232* (2013.01)
(58) Field of Classification Search
CPC ....... B21B 31/07; B21B 31/078; B21B 31/26; B21B 13/005
See application file for complete search history.

(56) References Cited

U.S. PATENT DOCUMENTS 3,892,446 A 7/1975 Rich, Jr.
4,692,040 A * 9/1987 Ebaugh ................... B21B 31/07
384/477

(Continued)

FOREIGN PATENT DOCUMENTS

DE 102005030033 A1 1/2006
DE 102006025377 A1 1/2007

(Continued)

OTHER PUBLICATIONS

International Search Report and Written Opinion for Appl. No. PCT/EP2021/075030 mail date Jan. 7, 2022, 22 pages.

(Continued)

*Primary Examiner* — Teresa M Ekiert
(74) *Attorney, Agent, or Firm* — Maine Cernota & Curran

(57) ABSTRACT

The invention relates to a roller assembly (1) comprising two roller shafts which are mounted in a housing. The roller shafts are preferably mounted parallel to each other, and each roller shaft has at least one roller ring on the axial end region of the roller shaft. A seal assembly is secured on or in the housing, said seal assembly being used to allow the axial end region of the roller shafts, together with the roller rings, to be sealed off from the interior of the housing. In order to allow the seal assembly to be serviced in a substantially shorter amount time than before in the event of wear in the seal assembly and in order to allow the replacement of seals in particular, the seal assembly has: a seal support plate which is secured to or in the housing or is part of the housing; two slide rings for each roller shaft, said slide rings being arranged on the roller shaft; a double-lip seal with two seal lips for each roller shaft, said double-lip seal being arranged on the seal support plate, wherein each of the seal lips rests against a slide ring; and a support ring for each roller shaft, said support ring being arranged in the radially inner region of the double-lip seal and radially supporting (Continued)

same. A rotation prevention mechanism is provided, by means of which the double-lip seal is prevented from rotating relative to the seal support plate.

11 Claims, 2 Drawing Sheets

(56) References Cited

U.S. PATENT DOCUMENTS

| | | |
|---|---|---|
| 4,910,987 A | 3/1990 | Woodrow |
| 5,855,134 A | 1/1999 | Womelsdorf |

FOREIGN PATENT DOCUMENTS

| | | |
|---|---|---|
| DE | 102007022316 B4 | 11/2008 |
| DE | 102018104123 B3 | 2/2019 |
| EP | 0196117 B1 | 10/1986 |
| EP | 0850705 B1 | 7/1998 |
| JP | S62183167 U | 11/1987 |
| JP | 2005040799 A | 2/2005 |
| JP | 2007301614 A | 11/2007 |

OTHER PUBLICATIONS

Siemens-Vai.com, Siemens SpeedFlex Seals composite rod mill seals. Datasheet[online]. Siemens-Vai, 2 pages.
SMS group "Quick-Change seal with anti-rotation lock" Dec. 12, 2019, 13 pages.
Examination Decision for Japanese Patent Application No. 2023-519305 mail date May 8, 2024, 15 pages.

* cited by examiner

ROLLER ASSEMBLY

RELATED APPLICATIONS

This application is a national phase application filed under 35 USC § 371 of PCT Application No. PCT/EP2021/075030 with an International filing date of Sep. 13, 2021, which claims priority of German Patent Application 10 2020 212 179.61717795.7 filed Sep. 28, 2020. Both of these applications are incorporated by reference in their entirety for all purposes.

FIELD OF THE INVENTION

The invention relates to a roller assembly with two roller shafts mounted in a housing, wherein the roller shafts are preferably mounted parallel to one another, wherein the roller shafts each carry a roller ring in their axial end region, wherein a seal assembly, by which the axial end region of the roller shafts together with the roller rings can be sealed relative to the interior of the housing, is secured at or in the housing.

BACKGROUND OF THE INVENTION

A roller assembly of the kind according to category is known from EP 0 850 703 B1. DE 10 2018 104 123 B3, U.S. Pat. Nos. 3,892,446 A, 4,910,987 A and EP 0 196 117 B1 also relate to the design of seal assemblies.

In operation, for example in a wire or rod rolling mill, the seal assemblies of such a roller assembly are strongly loaded, which results from high and substantially fluctuating temperatures, from contaminations due to dirt and scale, from influencing by cooling water and from high friction forces during operation. The seal assemblies in each instance have to seal off the region of the roller rings from the interior of the housing so that on the one hand no water or dirt enters the housing, but on the other hand also no oil can escape from the housing.

Thus, wear occurs at the sealing elements of the seal assembly, which impairs the functional capability of the seal assemblies and requires frequent change of the seals.

In that case, the expenditure of time for change of the sealing elements is very high. Double lip seals which are provided with a spring steel ring, a plastics material ring or a similar bracing element in order to guarantee the sealing function in operation and prevent rotational movement relative to a seal support plate are known. The bracing force of the spring steel ring or plastics material ring for securing of the seal requires, in view of the confines of the installation situation and due to the required deformation of the bracing ring during mounting, demounting of the seal support and the other fittings secured thereto (guides, guide mount, cooling pipe, etc.). Known bracing elements which need a smaller amount of deformation and thus enable mounting of the seal without demounting of the seal support do not exert sufficient radial force to preclude co-rotation of the double lip seal relative to the seal support plate; a high degree of wear and failure of the seal are the consequence.

Change of the seal elements therefore represents a significant block on cost. The service life of the seal is typically in the region of three to four weeks, strongly depending on use. A time in the region of approximately 30 minutes is set for changing the sealing elements per seal location, which due to the number of roll stands (for example 10-stand rolling unit with 20 seals) adds up over the year, in the case of a given hourly rate of the plant, to a substantial amount of cost.

SUMMARY OF THE INVENTION

The invention has the object of so developing a roller assembly of the kind stated in the introduction that it is possible in the case of wear in the seal assembly to be able to service this and, in particular, replace seals in a significantly shorter time than hitherto. The demounting and mounting effort required for that purpose shall be substantially reduced and as a result corresponding costs able to be saved. The change times shall be able to be reduced by that without impairing the service life of the seal.

Fulfilment of this object by the invention is the seal assembly comprises:
  a seal support plate which is secured to or in the housing or is part of the housing,
  two respective slide rings, which are arranged at the roller shaft, for each roller shaft,
  a respective double lip seal, which is arranged at the seal support plate (or at an injection-moulded ring arranged in the seal support plate; see below), for each roller shaft, the double lip seal having two sealing lips, wherein the sealing lips each bear against a slide ring, and
  a respective support ring, which is arranged in the radially inwardly disposed region of the double lip seal and radially supports this, for each roller shaft,
  wherein a rotation prevention means, by which rotation of the double lip seal relative to the seal support plate is prevented, is arranged, and wherein the rotation securing means comprises at least one (preferably exactly one) radial projection which is arranged at the seal support plate (or at the thrower ring) and which engages in a corresponding recess in the double lip seal or wherein the rotation prevention means comprises at least one (preferably exactly one) radial projection which is arranged at the double lip seal and which engages in a corresponding recess in the seal support plate (or in the thrower ring).

The proposed solution makes it possible, as can be seen in more detail in the following, for demounting of the double lip seal to be possible with demounting of only one of the two slide rings.

According to one form of embodiment of the invention the support ring is constructed as a separate component, but alternatively it can also be integrated in the double lip seal. The support ring is in that case designed in such a way, in particular, that it does not have to be deformed or has to be deformed only slightly for mounting and that mounting of the support ring is possible with demounting of only one of the two slide rings.

The double lip seal is preferably free of other stiffening elements. It is thus very elastic during mounting and can be mounted with demounting of only one of the two slide rings.

The double lip seal and support ring are preferably so toleranced relative to one another that in the mounted state a radially outwardly directed force is exerted by the support ring on the double lip seal. Consequently, the stability of the axial position of the double lip seal in operation is managed not by this in itself, but by the support ring.

The projection and the recess can be formed to be congruent with one another. However, it is also possible for the projection at one component to co-operate with a groove at another component, which extends over the entire width of the component.

According to a preferred form of embodiment the projection is configured as a cylinder or pin.

The support ring preferably has a chamfer at least at an axial end region. This significantly facilitates mounting and excludes damage to the double lip seal and the support ring during mounting.

The support ring is preferably constructed as a steel ring, but can also be made of other materials suitable to withstand operating and environmental conditions in similar form. Through use of a suitable material, multiple reusability of the support ring for mounting of further seals is made possible insofar as the support ring is not integrated in the double lip seal.

The radial thickness of the support ring depends on the size of the seals. In one possible embodiment of the invention the radial thickness of the support ring is between 1 millimetre and 10 millimetres, with particular preference between 2 millimetres and 5 millimetres.

The seal support plate is preferably provided with a device for the feed of sealing water or sealing air. For that purpose a thrower ring is installed in the seal support plate or such is integrated in the seal support plate.

The roller assembly is preferably a component of a wire or rod roll stand.

The proposed seal arrangement, constructed as a slide ring seal, is thus preferably used in modular roll housings in metallurgical plants, especially in wire and rod rolling mills.

In that case, typically ten stands are present in a usual plant configuration in the region of a wire rolling unit in which the rolled product is rolled to final dimensions. The seal support plate with two thrower rings and two double lip seals is present in each of the stands. Recesses, which due to the parallel arrangement of the two roller shafts have the form of an 'eight', for the double lip seals are provided in the seal support plate.

The proposed solution allows a substantial reduction in the time for change of the double lip seal. It is advantageous that in the case of change of the seal it is possible to dispense with demounting the seal support plate, so that existing fittings at the plate (guides, guide mount, cooling pipe, etc.) also do not have to be demounted.

It is ensured by the provided rotation prevention means (i.e. rotation of the double lip seal relative to the seal support plate is excluded) that wear at the seal remains low and the sealing function is guaranteed. Without such prevention means friction and heat, which damage the seal and lead to premature failure, would arise due to co-rotation of the seal.

Substantially reduced shutdown times and consequently a cost advantage for the operator of the rolling mill thus result. Moreover, maintenance costs are also substantially reduced.

The possibility thus arises of rapid change of the seal with the seal support plate mounted. By comparison with previously known solutions, the time for change of the seal can be significantly reduced without reduction in the service life of the seal occurring.

The support ring used is preferably made of steel and ensures that a sufficient bracing force is given in operation, which reliably holds the double lip seal in axial position so that an effective sealing action is given. After change of the double lip seal the support ring is reused at the same sealing location insofar as the support ring is not integrated in the double lip seal. Reusability of the support ring reduces the material costs of servicing.

The design of the support ring with a chamfer enables mounting without high expenditure of force and without damage to the seal or the support ring.

When in the present case mention is made of double lip seal it is, by that, to be understood that the said sealing element has at least two sealing lips, each of which runs on a respective slide ring. However, this does not exclude still further seal lips being able to be arranged at the double lip seal.

BRIEF DESCRIPTION OF THE DRAWINGS

An embodiment of the invention is illustrated in the drawing, in which.

DETAILED DESCRIPTION

Figure 1:
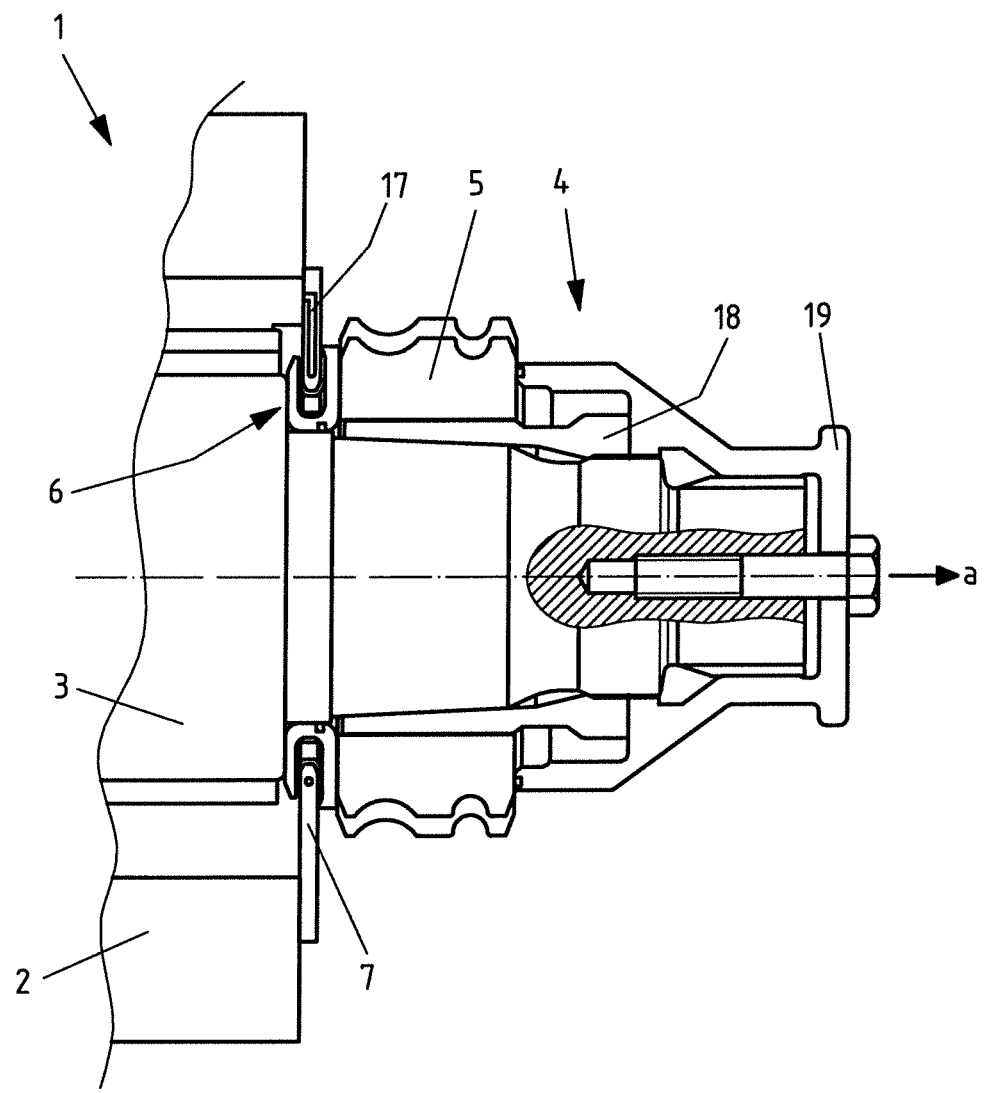
FIG. 1 shows the end region of a roller shaft of a wire rolling stand, which is mounted in a housing, in the axial end region of which a roller ring is mounted, wherein a seal assembly is arranged to be effective between the roller ring and the housing.

A part of a roller assembly 1 which is a component of a wire or rod rolling mill is to be seen in FIG. 1. In that case, a roller shaft 3 is mounted in a housing 2. Not illustrated is that two adjacently arranged roller shafts 3 are mounted in the housing 2, wherein the two roller shafts are arranged parallel to one another, i.e. the axes a of the roller shafts are parallel.

A respective roller ring 5 which serves for rolling the material, i.e. the material to be rolled is rolled between two co-operating roller rings 5, is arranged in the axial end region 4 of each roller shaft 3. The roller ring 5 is fixed on the journal of the roller shaft 3 by means of a cone sleeve 18, for which purpose a cap 19 secured by means of a screw in the end region of the roller shaft 3 also serves.

A seal assembly 6 constructed as a slide ring seal is provided so that the interior of the housing 2 is sealed off relative to the rolling region by the roller rings 5, in order that no contaminants can penetrate into the interior of the housing and also no oil can escape from the housing.

The seal assembly 6 comprises a seal support plate 7, which is screw-connected with the housing 2 to be fast. The seal support plate 7 is also provided with a sealing water feed or sealing air feed 17, i.e. an integral component of the seal support plate is a thrower ring by which sealing water or sealing air can be delivered in the direction of the roller ring 5.

Figure 2:
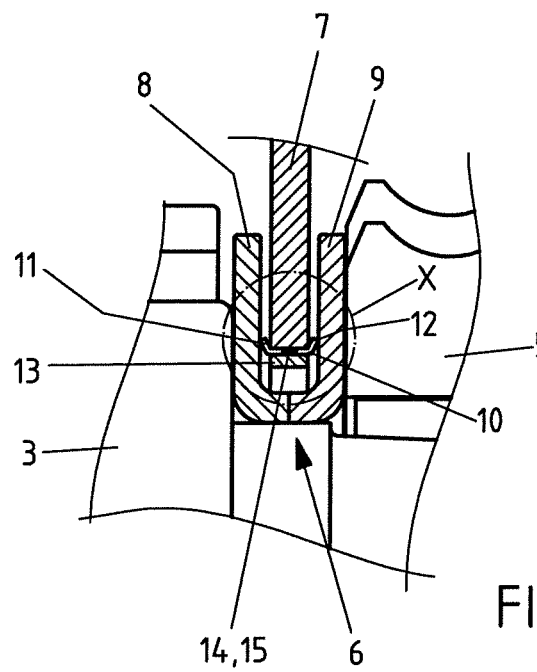
FIG. 2 shows an illustration, to enlarged scale, of the seal assembly
Figure 3:
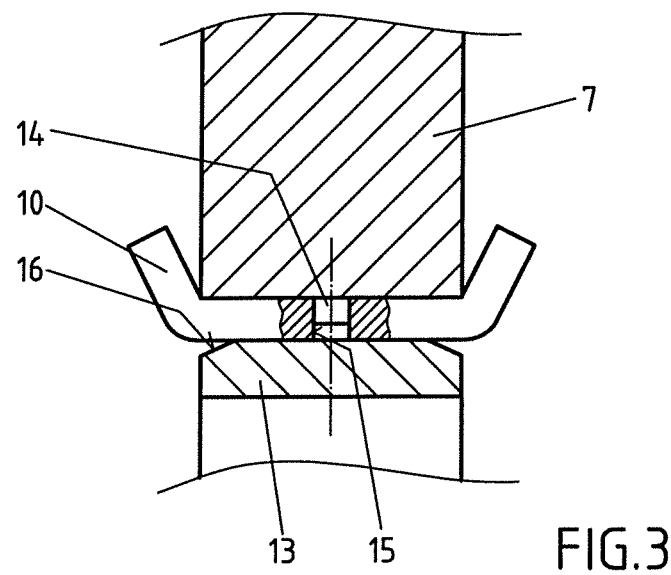
FIG. 3 shows the detail 'X' according to FIG. 2.

The exact design of the seal arrangement 6 is evident from FIGS. 2 and 3.

It is evident therefrom that the seal assembly 6 in the first instance comprises two slide rings 8 and 9, which are mounted in the illustrated manner and which together form a substantially U-shaped structure in radial section, per sealing location. A double lip seal 10 comprising two sealing lips 11 and 12 is secured to the seal support plate 7. In that case, one sealing lip 11 in the mounted state frictionally bears against the slide ring 8, whilst the sealing lip 12 frictionally bears against the slide ring 9.

The double lip seal 10 is in that case constructed without any reinforcing element so that a structure which is easily deformable and thus also able to be readily mounted is present. The stability of the double lip seal 10 in operation of the roller assembly 1 is managed by a support ring 13, as can be best seen from FIG. 3. The support ring 13 is a thin-walled steel ring which is provided at one of its axial ends with a chamfer 16.

Rotation prevention means 14, 15 are provided so that in operation of the plant the double lip seal 10 cannot rotate (about the axis a) relative to the seal support plate 7, as can be best seen from FIG. 3.

According to that, the seal support plate 7 has at a circumferential position a projection 14, which extends in radial direction, in the form of a pin or cylinder, which engages in a congruent recess 15 in the double lip seal 10. Relative rotation about the axis a between the seal support plate 7 and the double lip seal 10 is thus prevented. If the double lip seal 10 has to be exchanged as a consequence of wear this can be carried out in a substantially simpler and quicker manner than is the case with previously known solutions.

The procedure for exchange of the double lip seal 10 takes place as follows:

Initially the cap 19 is unscrewed, the cone sleeve 18 removed and the roller ring 5 taken off. The outwardly disposed slide ring 9 is then withdrawn in axial direction.

The support ring 13 is now drawn off in axial direction so that the double lip seal 10 is accessible; it is removed, which as a consequence of its freedom from reinforcing elements is free of problems.

A new double lip seal 10 is inserted with account taken of the agreement of projection and recess. Not only the seal support plate 7, but also the inner slide ring 8 remain in the mounted state.

Once the new double lip seal 10 has been inserted, the support ring 13 is pushed on again, wherein the chamfer 16 enables easy mounting and ensures that no damage arises at the double lip seal 10. The support ring 13 holds the double lip seal 10 stably in the intended operating position and exerts a force, which acts radially outwardly, on the double lip seal 10 so that this is reliably held at the seal support plate 7.

The outer slide ring 9 is now pushed on again and the further components (roller ring 5, cone sleeve 18 and cap 19) are then remounted.

The time requirement for that purpose is only a fraction of that hitherto usual, since, in particular, the seal support plate 7 together with the attachments and fittings present thereat does not have to be demounted.

As a consequence of the described simplified demounting and mounting procedure the proposed assembly thus offers a substantial increase in productivity of the rolling mill, which cannot be achieved in conventional manner.

REFERENCE NUMERAL LIST 1 roller assembly
2 housing
3 roller shaft
4 axial end region
5 roller ring
6 seal assembly
7 seal support plate
8 slide ring
9 slide ring
10 double lip seal
11 sealing lip
12 sealing lip
13 support ring
14, 15 rotation prevention means
14 projection (cylinder/pin)
15 recess
16 chamfer
17 sealing water feed/sealing air feed
18 cone sleeve
19 cap
a axis

What is claimed is:

1. A roller assembly, comprising:
two roller shafts mounted in a housing, wherein each of the roller shafts carries at least one roller ring in an axial end region thereof;
a seal assembly, by which the axial end regions of the roller shafts together with the roller rings are sealed relative to an interior of the housing; the seal assembly being secured at or in the housing,
wherein the sealing assembly comprises:
a seal support plate, which is secured at or in the housing or is part of the housing,
a respective slide ring for each of the roller shafts, the slide rings being arranged at the roller shafts,
a respective double lip seal for each of the roller shafts, each of the double lip seals having two sealing lips and being arranged at the seal support plate, wherein the sealing lips each bear against a respective one of the slide rings, and
a respective support ring for each of the roller shafts, each of the support rings being arranged in a radially inwardly disposed region of the respective double lip seal and radially supporting the respective double lip seal,
for each of the double lip seals, a rotation preventing feature by which rotation of the double lip seal relative to the seal support plate is prevented, the rotation preventing feature comprising:
at least one radial projection which is arranged at the seal support plate and engages in a corresponding recess in the double lip seal; or
at least one radial projection which is arranged at the double lip seal and engages in a corresponding recess in the seal support plate.

2. The roller assembly of claim 1, wherein the support ring is constructed as a separate component or is integrated in the double lip seal.

3. The roller assembly of claim 1, wherein the double lip seal is free of stiffening elements.

4. The roller assembly of claim 1, wherein the double lip seal and the support ring are so toleranced relative to one another that in the mounted state a radially outwardly directed force is exerted by the support ring on the double lip seal.

5. The roller assembly of claim 1, wherein the projection and the recess are formed to be congruent with one another.

6. The roller assembly of claim 1, wherein the projection is configured as a cylinder or pin.

7. The roller assembly of claim 1, wherein the support ring has a chamfer at least at an axial end region.

8. The roller assembly of claim 1, wherein the support ring is constructed as a steel ring.

9. The roller assembly of claim 1, wherein the seal support plate is provided with a device configured for feeding sealing water or sealing air.

10. The roller assembly of claim 1, wherein the roller assembly is a component of a wire or rod roll stand.

11. The roller assembly of claim 1, wherein the roller shafts are mounted parallel to one another.

* * * * *